Aug. 15, 1961 W. V. HUTCHISON 2,995,843
DITCH DIGGER

Filed Oct. 4, 1957 2 Sheets-Sheet 1

INVENTOR.
WILLIAM V. HUTCHISON
BY Fulwider, Mattingly & Huntley
ATTORNEYS

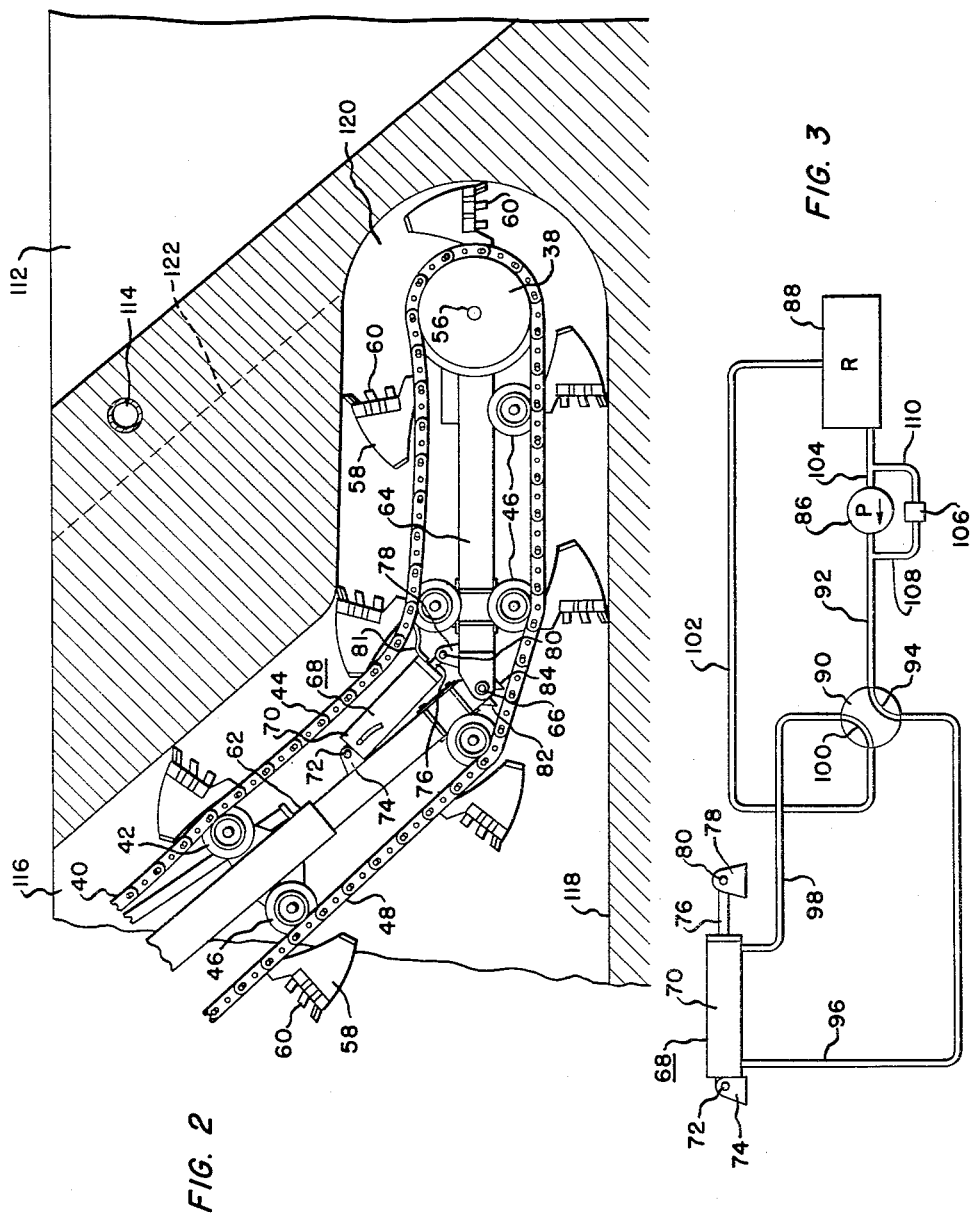

United States Patent Office 2,995,843
Patented Aug. 15, 1961

2,995,843
DITCH DIGGER
William V. Hutchison, 6245 Danbury Way,
San Diego, Calif.
Filed Oct. 4, 1957, Ser. No. 688,269
2 Claims. (Cl. 37—86)

The present invention relates to a trench digger of the mobile type including an endless chain-type conveyor carrying a series of buckets having digging teeth on the forward edges thereof.

Trench diggers of the aforementioned type usually include a trailing boom having the upper-forward end thereof pivotally connected to the tractor for swinging movement in a vertical plane. A sprocket is or sprockets are carried by the upper-forward end of the boom, and, a sprocket is or sprockets or what is known in the trade as trailing wheels, are carried by the lower rearward end of the boom. These sprockets rotate about parallel axes transverse to the length of the boom. An endless chain system encompasses the boom and is carried by the sprockets, the lower run of the chain system being below the boom while the upper run is above the boom. A series of buckets are carried by the chain system and are so arranged that the mouths thereof face forwardly on the lower run. The front edges of those buckets carry digger teeth.

In practicing the present invention the boom is formed of two sections, one extending rearwardly of the other. The rear end of the front section is pivotally connected to the front end of the rear section; the pivotal condition between the sections is such that the rear section can be swung vertically independently of the front section. Means such as a hydraulic motor is employed for moving the rear section independently of the front section.

An advantage of the present invention lies in that the trench digger can be used for tunneling for example under pipes.

Further objects and advantages will be apparent from the following description, reference being had to the accompanying drawings wherein a preferred embodiment of the invention is illustrated.

In the drawings:

FIG. 2 is a fragmentary view of the rear end of the trench digger showing the sections of the boom at an angle with one another and as the trench digger is employed for tunneling; and FIG. 3 is a diagrammatic view of the hydraulic system used for controlling the hydraulic motor which is used for imparting swinging movement to the rear section of the boom.

Figure 1:
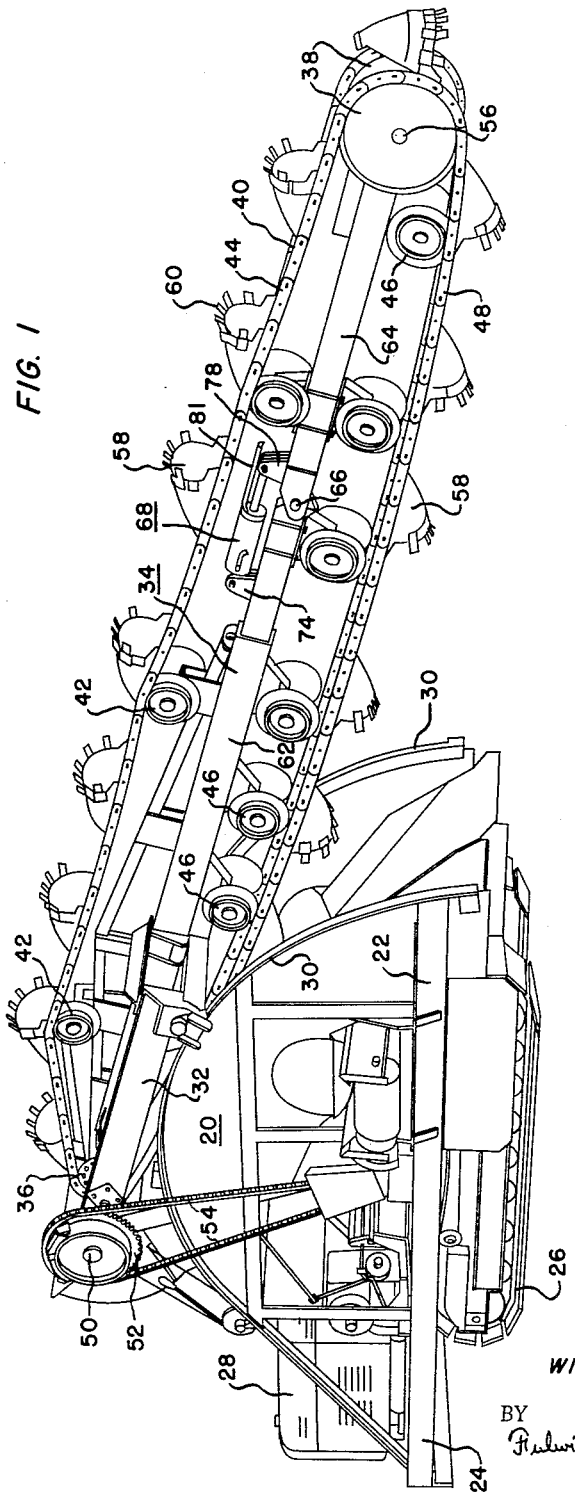
FIG. 1 is a perspective view of a trench digger showing my improvement applied thereto.

Referring more in detail to the drawings, the trench digger 20 includes a tractor 22. This tractor includes a main frame 24 which is moved forwardly or rearwardly by the tread mechanism 26. The frame 24 carries an engine 28, which, through suitable transmission mechanism, actuates the tread mechanism 26.

The main frame 24 carries arcuate shaped tracks 30 on opposite sides thereof. Guides 32 are carried by the tracks 30 and the guides carry a boom 34. The guides 32, in following the track 30, cause the boom 34 to be raised and lowered, that is, as the guides 32 are moved rearwardly, namely to the right, as viewed in FIG. 1, the boom will be lowered and conversely when the guides are moved to the left, the boom will be raised. Suitable power driven mechanism is employed for moving the guides and the boom.

The upper forward end of the boom 34 carries sprockets, one of which is shown at 36, and the rear or lower end of the boom carries sprockets 38, known in the trade as trailer wheels. An endless chain system 40 encompasses the boom 34 and the links of the chain mesh with the teeth of the sprockets. A series of upper free rollers 42 are carried by the boom for guiding and supporting the upper run 44 of the chain system and like rollers 46 guide the lower run 48 of the chain system. The upper sprockets 36 are fixed to a shaft 50, whose axis is at right angles to the length of the boom 34. The shaft 50 has a sprocket 52 fixed thereto and this sprocket is controllably driven by the engine 28 through a chain 54. A shaft 56 for the trailer wheels 38 is carried by the extreme rear end of the boom 34 and the axis thereof is parallel with the axis of the shaft 50.

A series of buckets 58 are fixed to the chain system in such a manner that the mouth ends thereof face forwardly on the lower run 48. The forward edge of the buckets carry digger teeth 60.

The trench digger 20 as is hereinbefore described, is of standard construction and is similar to the "Parsons 250 Trenchliner" as manufactured by Parsons Company, Koehring Subsidiary, Newton, Iowa, and as shown in the bulletin of said company "KP 335-1."

In practicing the present invention, I divided the boom 34 into two main sections, referred to herein as the forward section 62 and the rear section 64. These two sections are pivotally connected with one another through a pin 66, the pin 66 extending through the rear end of the forward section 62 and the forward end of the rear section 64. The axis of the pin 66 is parallel with the axes of the shafts 50 and 56. Thus the rear section 64 can be swung in a vertical plane independently of the section 62.

The section 64 is swung independently of the section 62 through a motor of any desired type, and is herein shown as a hydraulic motor or jack 68. The cylinder 70 of the jack 68 is pivotally connected by pin 72 to a bracket 74 carried on the upper side of the boom section 62, and the outer end of the plunger 76 is pivotally connected to a bracket 78, carried on the upper side of the boom section 64, by a pin 80. Thus it will be seen that when the plunger rod 76 is moved inwardly of the cylinder 70, the boom section 64 will be swung vertically independently of the boom section 62, and also when the plunger rod 76 is forced outwardly, the boom section 64 will be moved toward aligning position with the boom section 62. The plunger rod is covered with a flexible shield 81. Complementing stops 82 and 84 are carried respectively by the under side of the boom sections 62 and 64 and adjacent the rear end of boom section 62 and the forward end of boom section 64, to prevent the boom section 64 from moving downwardly beyond alignment with the section 62.

Any suitable type of control system may be employed for the motor 68. FIG. 3 diagrammatically shows such a system wherein the pump is shown at 86, the oil reservoir at 88 and a control valve at 90. The control valve is shown in the position in which the hydraulic system has actuated the jack 68 to align boom section 64 with section 62. The pump forces the piston rod 76 to the right through the pipe line 92, valve passage 94 and pipe 96 to the left side of the cylinder 70; oil is exhausted from the right side of cylinder 70 through pipe 98, valve passage 100, pipe 102, to reservoir 88. The pump 86 is connected with the reservoir through a pipe 104, and a relief valve 106 is connected with pipe 92 through a pipe 108 and with the low pressure pipe 104 through pipe 110. To move boom section 64 out of alignment wtih boom section 62, the valve 90 is moved 90 degrees in a counter-clockwise direction whereby hydraulic fluid is delivered from the pump 86 to the right side of the cylinder 70 through the following passage: Pipe 92, valve passage 94 and pipe 98; fluid is exhausted from the left side of the cylinder 70 through pipe 96, valve passage 100 and pipe 102 to the reservoir 88.

The present invention is particularly useful in excavating earth underneath, for example, pipe lines. In the normal operation of the digger, the boom 34 including both sections 62 and 64, extends downwardly at an angle of approximately 45 degrees. When the machine moves forwardly, that is, to the left as viewed in FIGS. 1 and 2, the teeth 60 on the buckets 58 will loosen the ground and the dirt loosened will be picked up by the buckets on the lower run 48 and move forwardly. Such excavation is shown at 112 in FIG. 2. The location of pipes being known, the excavation at 112 is stopped prior to striking, for example, the pipe 114. The boom 34 is then lifted out of the excavation 112 and the machine is moved forwardly beyond the pipe 114. Then the boom 34 is again lowered starting the excavation 116 and the machine is moved rearwardly, that is to the right, as viewed in FIG. 2. After the desired depth has been reached as indicated at 118, the boom section 64 is swung to a position in which it approaches horizontal. The digging is then continued with the machine moving rearwardly, that is to the right, until the lower horizontal excavation or tunnel 120 merges with the excavation 112. Of course the angling excavation line 116 will also be moved to the right while the tunneling action is being carried out; the angling excavation 116 will be moved to approximately the dotted line 122.

Thus it will be seen from the foregoing that I have provided a trench digging machine which also functions as a tunneling device for tunneling under pipes or the like. In this manner the hand labor of manually excavating about pipes is entirely eliminated, and also special machinery for digging around pipes has been eliminated.

While the form of embodiment herein shown and described constitutes a preferred form, it is to be understood that other forms may be adopted falling within the scope of the claims that follow.

I claim:

1. A trench digger comprising in combination with a tractor, a boom including a rearwardly extending section; means pivotally connecting the forward end of said boom section to the tractor for movement of said section about a horizontal axis, said boom including a second section extending rearwardly of the first section; means including a pivot for pivotally connecting the forward end of the second section with the rear end of the first section for swinging movement of said second section about a horizontal axis to and from a substantially horizontal plane independently of the first section said first section being of such length that the second mentioned pivotal connecting means is disposed below the plane of the ground on which the tractor moves when the first section is lowered; a sprocket rotatably carried by the forward end of the first section on an axis transverse to the length of the said section; a sprocket rotatably carried by the rear end of the second section on an axis parallel with the axis of the first mentioned sprocket; an endless chain having upper and lower runs and carried by the sprockets; a series of buckets carried by the chain and moved thereby; means for rotating the first mentioned sprocket for driving said chain when the second section is in a substantially horizontal plane and when the digger is moved rearwardly; means including a motor connected between the adjacent pivotally mounted ends of the boom sections and lying between the upper and lower runs of the chain for moving the second section about the pivotal means therefor and for locking the second section in desired fixed relationship with the first section; and stop means on both sections for preventing downward movement of the second section beyond alignment with the first section.

2. A trench digger comprising in combination with a tractor, a boom including a rearwardly extending section; means pivotally connecting the forward end of said boom section to the tractor for movement of said section about a horizontal axis, said boom including a second section extending rearwardly of the first section; means including a pivot for pivotally connecting the forward end of the second section with the rear end of the first section for swinging movement of said second section about a horizontal axis to and from a substantially horizontal plane independently of the first section said first section being of such length that the second mentioned pivotal connecting means is disposed below the plane of the ground on which the tractor moves when the first section is lowered; a sprocket rotatably carried by the forward end of the first section on an axis transverse to the length of the said section; a sprocket rotatably carried by the rear end of the second section on an axis parallel with the axis of the first mentioned sprocket; an endless chain having upper and lower runs and carried by the sprockets; a series of buckets carried by the runs of the chain and moved thereby; means for rotating the first mentioned sprocket for driving said chain when the second section is in a substantially horizontal plane and when the digger is moved rearwardly, said sections being alignable with one another; means including a hydraulic motor connected between the adjacent pivotally mounted ends of the boom sections, and lying between the upper and lower runs of the chain for raising the rear end of the second section independently of the front end of said second section and for locking the second section in desired fixed relationship with the first section; and stop means on both sections for preventing downward movement of the second section beyond alignment with the first section.

References Cited in the file of this patent

UNITED STATES PATENTS

| | | |
|---|---|---|
| 502,151 | Vollerhing et al. | July 25, 1893 |
| 1,080,250 | Blick | Dec. 2, 1913 |
| 2,552,649 | Protzeller | May 15, 1951 |
| 2,620,575 | Pace | Dec. 9, 1952 |
| 2,867,427 | Russell et al. | Jan. 6, 1959 |

FOREIGN PATENTS

| | | |
|---|---|---|
| 285,043 | Italy | Apr. 30, 1931 |